United States Patent Office 3,823,073
Patented July 9, 1974

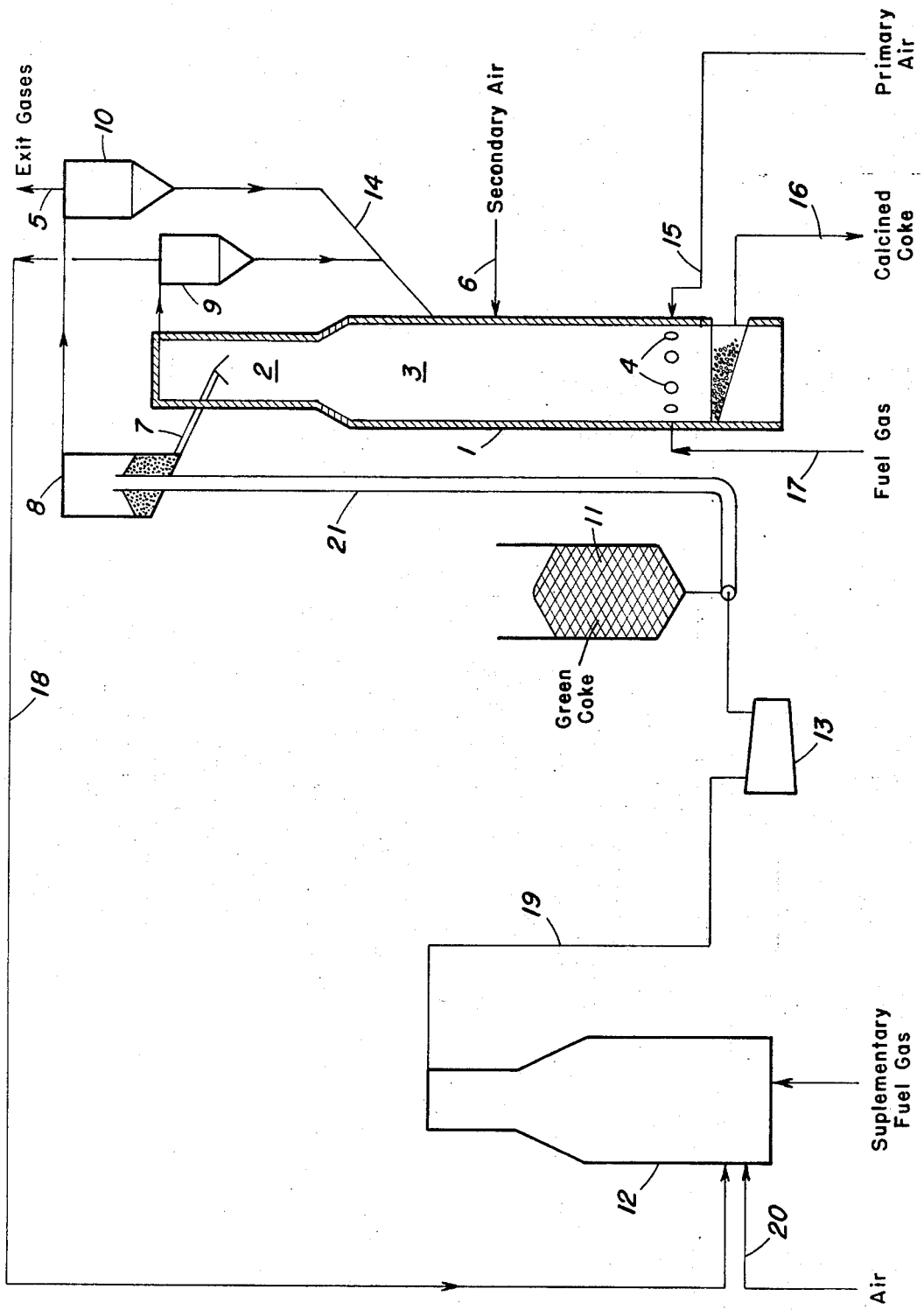

3,823,073
CALCINING COKE IN VERTICAL KILN
Ari A. Minkkinen, Beaver Brook Garden Apts. H–19,
Lincoln Park, N.J. 07035
Filed Jan. 26, 1972, Ser. No. 220,882
Int. Cl. C10b 49/06, 49/10
U.S. Cl. 201—25                      7 Claims

ABSTRACT OF THE DISCLOSURE

A new method of calcining coke in a vertical kiln in two zones to shorten the kiln residence time and to provide efficient heat transfer to the coke particles. Green coke is dried, preheated and fed to a choking zone of a vertical kiln for calcining in suspension with counter-current flow of ascending flue gas; then further calcined in a free fall zone of the kiln by contact with ascending combustion gas. Coke is retained in a radiant-heat-soaking zone before removal for cooling. Fines are recovered for calcining and heat in the flue gas is recovered and ultilized.

CROSS-REFERENCE TO RELATED APPLICATIONS

None.

BACKGROUND OF THE INVENTION

Raw coke derived from petroleum or coal tar pitch or the like has recently been in great demand because of its specific desired qualities for use in nuclear reactors, the aluminum industry and electrode manufacture. To meet certain specifications of low sulfur and volatile matter content and high carbon purity, green coke must be calcined. Calcining is generally known in the coke industry as the removal of volatile matter from combustible solid materials. In the prior art, calcining of green coke is performed in an inclined or horizontal kiln by slow rotation of the kiln or stirring with a mechanical rake to cause the coke particles to turn and be exposed to a hot gas stream either counter- or cocurrent to the flow of hot gases at about 2000–2400° F. Frequently due to inefficient heat transfer, this process requires more than an hour of residence time of the coke in the kiln. A long residence time is undesirable since large equipment is required. Moreover, a long exposure to the high temperature used can cause overcalcining, i.e., coke is burned to carbon dioxide, thus reducing the yield. Furthermore, the operation is complicated because the kiln has moving parts, and breakdowns invariably occur. Additionally, substantial quantities of product may be lost due to too much handling.

The present invention overcomes these defects. It presents a more effective method of calcining by greatly reducing the time of calcining; therefore overcalcining and excess of handling does not occur. According to the present invention, both the coke production per kiln size and the coke quality are improved.

SUMMARY OF THE INVENTION

According to the present invention, coke calcining in a vertical kiln comprises introducing preheated green coke into an ascending hot flue gas stream in a choking zone whereby coke is calcined in suspension for a predetermined residence time; further calcining said coke in a free fall zone countercurrent to a stream of combustion gas; and removing hot calcined coke for cooling.

BRIEF DESCRIPTION OF THE DRAWING

The drawing is a schematic flow diagram of the process. A vertical shaft kiln 1 comprises two sections, the top section with the smaller cross-sectional area designated as the choking zone 2, and the bottom section as the free fall zone 3. Green coke, which often contains moisture, is dried, and preheated by a second flue gas generated from waste heat broiler 12 through line 19 after passing a blower 13. This flue gas also serves as a transporting medium to lift the green coke from storage bin 11 to a coke feeder 8 which is located adjacent to the choking zone, at a regulated rate so as to deliver a feed of constant mass throughput, mass per unit volume of the choking zone into the choking zone through line 7. Fines or undersized coke carried over by the flue gas are settled in cyclone 10 from which they are introduced into the free fall zone through line 14 without being passed into the choking zone. The fines free flue gas exits through line 5. Combustion gas may be generated by burning fuel gas or the like using wall burners 4 around the periphery of the kiln near bottom. Primary combustion air is introduced into the burner through line 15. Flue gas leaving the top of the kiln carries with it fines of uncalcined coke which are settled in cyclone 9; these fines are combined in line 14 with the fines from cyclone 10 and passed directly to the free fall zone for calcining. The flue gas separated from cyclone 9 contains a large portion of unburned materials. Its heating value is recovered by generating steam in a waste heat broiler 12 with additional fuel, if needed. The steam generated can be used to run a turbine for the blower or other mechanical devices. Calcined coke is removed from the bottom of the kiln in line 16.

DETAILED DESCRIPTION OF THE PROCESS

The novel features which are considered as characteristic of the invention are set forth, in particular, in the appended claims. The invention itself, however, will be best understood from the following description of a specific embodiment.

The coke calcining is carried out in a vertical shaft kiln comprising two zones, namely an upper or choking zone with a smaller cross-sectional area than the lower or free fall zone. Green coke or raw coke from a coker is crushed to approximately 1" particle size. The dried and preheated coke is calcined in the choking zone where coke particles are in suspension and remain in suspension while moving downward for a predetermined residence time.

This suspension can be best envisioned as a random turbulent fluid particle system of approximately fixed voidage (i.e. bulk density). The average length of time (i.e. residence time) that the coke particles are held in the choking zone is governed by the vertical height of the zone. As fresh feed enters the suspension at the top of the zone, calcined coke falls out at the bottom, thus always maintaining a fixed equilibrium voidage of the suspension. For a volatile matter content of about 10–20%, the coke should be subjected in the choking zone to a temperature of about 2200–about 2500° F. for about 30–50 seconds, preferably about 2300° to about 2500° F. for about 30 to 40 seconds. The flow of the hot gas should be maintained at the choking rate; otherwise, solids will be lifted into the cyclone or dropped into the lower zone with insufficient calcining. The major portion of the calcining is done in this zone.

A secondary air inlet is provided between the choking zone and burners to supply additional gas to sustain the coke particles in the choking zone and to burn a controlled amount of the volatile matter and coke dust.

In the free fall zone, the cross-sectional area is designed to be larger than that of the choking zone to decrease the drag induced by the combustion and flue gases so that the coke particles can be dropped from suspension and allowed to accelerate toward their terminal velocity.

The conditions existing in the free fall zone are most severe, consequently the residence time, governed by the height allowed for particle free fall, is kept to a minium, so as not to over-expose the coke to the severe environment. Removal of the remainder of the volatile constituents is accomplished in the free fall zone at a temperature of about 2500–2700° F. for about 2–5 seconds.

The above temperatures and residence times for calcining are the preferred conditions; however, they may have to be varied in case of unusual volatile matter contents of the green coke feed or extra stringency of specifications for the final product.

Calcined coke falls to the botom of the kiln where the coke is subjected to radiant heat in a non-oxidizing environment until its removal for cooling. As the calcined coke piles up, the lower portion of the coke is withdrawn continuously to be cooled. The cooling can be done by any conventional means.

To achieve a further advantage in efficiency and economy, a second flue gas from the waste heat boiler having a temperature of about 600° F. having been boosted in pressure by a blower, is introduced through a pipe 21 connected with the coke bin, thus carrying with it the coke to the coke feeder which is at the same elevation as the top of the kiln. This feature overcomes the problems of plugging, erosion and corrosion of a mechanical bucket conveyor system.

The flue gas not only lifts but also preheats and dries the coke, which is continuously charged into the kiln at a controlled rate.

Fines entrained in the feed transporting gas and the existing flue gas can advantageously be separated from the gases in cyclones 9 and 10 and recycled into the free fall zone, bypassing the choking zone. The second flue gas leaving cyclone 10 exits through line 5, whereas the flue gas leaving cyclone 9 is introduced to waste heat boiler.

Coke dust entrained in the flue gas can be burned in the waste heat boiler 12, along with the unburned volatile matter in the flue gas. Since there is no excess air fed to the kiln, the flue gas will contain hydrogen and carbon monoxide which in themselves have high heating values, in addition to their sensible heat. Steam generated in the boiler can be used to supply energy to turbines to run blowers or other equipment.

I claim:

1. A process for calcining green coke in a vertical kiln comprising:

(a) drying and preheating green coke;
(b) introducing preheated green coke into an ascending hot gas stream in a choking zone of restricted diameter whereby the coke is in restricted flow countercurrent to the gas stream at a temperature of about 2200° F. to 2500° F. for a period of 30 to 50 seconds;
(c) further calcining the coke through a free-fall zone wherein coke particles fall freely countercurrent to the hot gas stream, at a temperature of about 2500° F. to 2700° F. for about 2 to 5 seconds; and
(d) removing the calcined coke.

2. The process of Claim 1 wherein the hot gas stream is a combustion gas and further comprising the step of subjecting the coke to radiant heat in a non-oxidizing environment prior to removing.

3. The process of Claim 1 further comprising removing a flue gas from the upper portion of the choking zone; separating first coke fines from the flue gas and recycling the fines to the free-fall zone of the kiln for calcining.

4. A process according to Claim 1, wherein second coke fines in the feed green coke are separated from the coke prior to calcining and are introduced directly into the free-fall zone by-passing the choking zone.

5. The process of Claim 1 wherein a flue gas is removed from the upper portion of the choking zone and is used to generate steam in a waste heat boiler.

6. The process according to Claim 5 wherein a second flue gas is generated in the waste heat boiler and serves to convey the feed green coke to the kiln.

7. The process according to Claim 5 wherein a second flue gas is generated in the waste heat boiler and is used to preheat said green coke.

References Cited
UNITED STATES PATENTS

| | | | |
|---|---|---|---|
| 2,738,316 | 3/1956 | Metrailer | 201—25 X |
| 3,086,923 | 4/1963 | Destremps et al. | 201—25 X |
| 2,716,628 | 8/1955 | Weikart | 201—36 X |

NORMAN YUDOFF, Primary Examiner

D. EDWARDS, Assistant Examiner

U.S. Cl. X.R.

201—27, 29, 31, 34, 37, 44; 423—461

UNITED STATES PATENT OFFICE
CERTIFICATE OF CORRECTION

Patent No. 3,823,073      Dated July 9, 1974

Inventor(s) Ari A. Minkkinen

It is certified that error appears in the above-identified patent and that said Letters Patent are hereby corrected as shown below:

Column 2, lines 3 and 25, "broiler", each occurrence, should read -- boiler --.

Signed and sealed this 8th day of October 1974.

(SEAL)
Attest:

McCOY M. GIBSON JR.
Attesting Officer

C. MARSHALL DANN
Commissioner of Patents